United States Patent
Fang et al.

(10) Patent No.: US 8,955,006 B2
(45) Date of Patent: Feb. 10, 2015

(54) ENTERTAINMENT CONTENT PURCHASE VIA ADVERTISING VIEWING CREDIT

(75) Inventors: Nicholas Fang, Redmond, WA (US); Todd Bowra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1462 days.

(21) Appl. No.: 12/057,335

(22) Filed: Mar. 27, 2008

(65) Prior Publication Data

US 2009/0249384 A1 Oct. 1, 2009

(51) Int. Cl.
| | |
|---|---|
| H04N 7/16 | (2011.01) |
| H04N 7/10 | (2006.01) |
| G06F 3/00 | (2006.01) |
| H04N 7/173 | (2011.01) |
| G06Q 30/02 | (2012.01) |
| H04N 21/254 | (2011.01) |
| H04N 21/258 | (2011.01) |
| H04N 21/466 | (2011.01) |
| H04N 21/478 | (2011.01) |
| H04N 21/4784 | (2011.01) |
| H04N 21/81 | (2011.01) |

(52) U.S. Cl.
CPC ............ *H04N 7/17318* (2013.01); *G06Q 30/02* (2013.01); *H04N 21/254* (2013.01); *H04N 21/25866* (2013.01); *H04N 21/4667* (2013.01); *H04N 21/47815* (2013.01); *H04N 21/4784* (2013.01); *H04N 21/812* (2013.01)
USPC ........ 725/23; 725/9; 725/32; 725/33; 725/34; 725/37

(58) Field of Classification Search
CPC .................... H04N 21/44222; H04N 21/4784
See application file for complete search history.

(56) References Cited

U.S. PATENT DOCUMENTS

| | | | |
|---|---|---|---|
| 5,855,008 A | 12/1998 | Goldhaber et al. | |
| 6,057,872 A * | 5/2000 | Candelore | ........................ 725/23 |
| 6,553,178 B2 | 4/2003 | Abecassis | |
| 6,988,277 B2 | 1/2006 | Kovac et al. | |
| 2002/0007313 A1* | 1/2002 | Mai et al. | ......................... 705/14 |
| 2002/0052788 A1 | 5/2002 | Perkes et al. | |
| 2002/0082910 A1 | 6/2002 | Kontogouris | |
| 2002/0133817 A1 | 9/2002 | Markel | |
| 2003/0040965 A1 | 2/2003 | Gelissen | |
| 2005/0203835 A1* | 9/2005 | Nhaissi et al. | .................. 705/39 |
| 2006/0168617 A1* | 7/2006 | Maetz et al. | ..................... 725/35 |
| 2006/0218576 A1 | 9/2006 | Johnson et al. | |
| 2006/0271979 A1* | 11/2006 | Hejna | .............................. 725/89 |
| 2007/0098165 A1 | 5/2007 | Yoshikawa | |
| 2007/0101362 A1 | 5/2007 | Spielman et al. | |
| 2008/0010206 A1* | 1/2008 | Coleman | .......................... 705/51 |
| 2008/0221986 A1* | 9/2008 | Soicher et al. | .................. 705/14 |
| 2013/0064527 A1* | 3/2013 | Maharajh et al. | ............. 386/343 |

OTHER PUBLICATIONS

"New Advertising Network AdPerk, Rewards Consumers for Watching Relevant Online Videos", Reduce My Fee, LLC., Jun. 26, 2007, pp. 2.
"Sugar Mama: Earn Airtime in Your Spare Time", Virgin Mobile USA, LLC, 2002-2008, p. 1.
"SpaceDimes", IPX Entertainment Inc., 2006-2007, pp. 3.

* cited by examiner

*Primary Examiner* — Gigi L Dubasky
(74) *Attorney, Agent, or Firm* — Sandy Swain; Judy Yee; Micky Minhas

(57) ABSTRACT

The purchase of entertainment content online via advertising credits is disclosed herein. One disclosed embodiment comprises providing an advertising content item to a user over a network, and awarding an amount of advertising viewing credit to the user based upon the advertising content item provided to the user. Next, a request is received from the user to view an entertainment content item. In response, the entertainment content item is provided to the user, and at least a portion of the advertising viewing credit is deducted in exchange for providing the entertainment content item.

18 Claims, 4 Drawing Sheets though the claimed subject matter. Furthermore, the claimed subject matter is not limited to implementations that solve any or all disadvantages noted in any part of this disclosure.

ENTERTAINMENT CONTENT PURCHASE VIA ADVERTISING VIEWING CREDIT

BACKGROUND

Audio and/or video entertainment media content may be provided to viewers in a number of ways. For example, entertainment content may be provided via a subscription purchase, a pay-per-view purchase, a pay-for-license model (for example, via the purchase of a pre-recorded digital video disk), or an advertisement-supported model in which advertisements are supplied in-band (i.e. interspersed throughout an entertainment content item). Such models are well-understood and feel comfortable to users, content providers, and advertisers.

As a result of this familiarity, online media purchase and access have been provided through the same models. At the same time, however, computer-driven online media playback has evolved to be much more flexible than such models may allow. For example, online media playback may provide instant access to a large body of content, the ability to pause, resume, and seek/skip through content on demand, and the ability to access the content from any location that provides a network connection.

In contrast, the online provision of advertisement-supported content may not permit the full utilization of such capabilities. For example, one method of providing advertisement-supported content online involves interspersing advertisements throughout the entertainment content item being watched. In such a model, users may be prohibited from skipping or fast-forwarding through the advertisements. This is in contrast to the main body of the media content, in which users may be allowed to take advantage of the playback capabilities offered by online media. Such a model may present significant technical challenges in implementing the enforcement of mandatory advertisement content playback while permitting more flexible entertainment content playback. Further, the playback experience may appear disjointed to a user.

The use of a pay-for-license model for providing content online may allow a user to more fully utilize the capabilities of providing entertainment content online. For example, one method of providing pay-for-license content online may comprise having a user pay for an entertainment content item up front, and then permitting the user to watch the item freely in its entirety. However, because such a model involves the user paying for the content out-of-pocket, the model may have less appeal to many users.

SUMMARY

Various embodiments related to the purchase of entertainment content online via advertising credits are disclosed herein. For example, in one disclosed embodiment, an advertising content item is provided over a network to a user for viewing, and an amount of advertising viewing credit is awarded to the user based upon the advertising content item provided to the user. Next, a request is received from the user for an entertainment content item. In response, the entertainment content item is provided to the user, and at least a portion of the advertising viewing credit is deducted in exchange for providing the entertainment content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
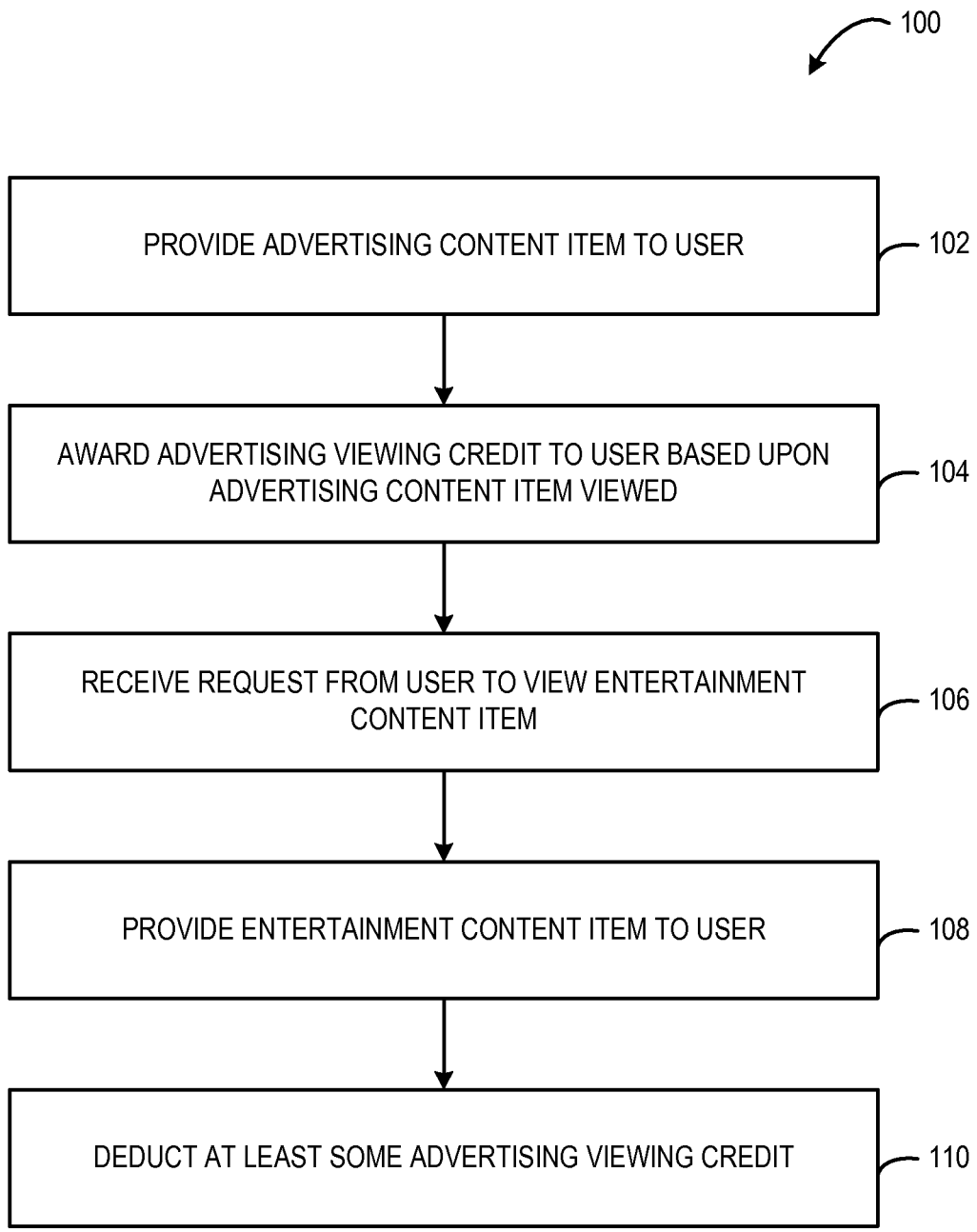
FIG. 1 shows a process flow depicting an embodiment of a method for providing entertainment content in exchange for advertising viewing credit.

FIG. 1 shows an embodiment of a method 100 for providing entertainment content in a manner that allows for the use of an advertising-supported media distribution yet facilitates the use of enhanced playback capabilities offered by online media distribution in which a user has full, robust playback control of an entertainment content item, rather than being restrained from various operating modes during the playback of interspersed advertisements. Method 100 comprises, at 102, providing an advertising content item, such as an audio and/or video advertisement, to a user, and then, at 104, awarding advertising viewing credit to the user based upon the advertising content item viewed. Next, at 106, method 100 comprises receiving a request from the user to view an entertainment content item. Upon receiving the request, the entertainment content item is provided to the user at 108, and at least some of the previously-awarded advertising credit is deducted at 110 in exchange for the entertainment content item. Further, if the user has insufficient advertising viewing credit to view a desired entertainment content item, the user can elect to view more advertising content items to earn more credit toward the purchase of the entertainment content item.

Alternatively or additionally, if a user has insufficient advertising viewing credit to view a desired item, the user may be offered the opportunity for a secondary viewing experience. For example, the user may be offered the opportunity to view only a portion of the entertainment content item, to view a first portion of the entertainment content item without interspersed advertising and a second portion of the entertainment content item with interspersed advertising, or any other suitable manner of providing a fractional portion of an entertainment content item in exchange for a fractional payment in advertising credit. It will be understood that the purchase of the entertainment content item may comprise a purchase of any suitable set of viewing and distribution rights to the purchased entertainment content item.

In this manner, method 100 separates the advertising content viewing experience from the entertainment content viewing experience. Because advertising is viewed in exchange for credit prior to requesting to view an entertainment content item, the provision of advertisements interspersed throughout an entertainment content item may be avoided. This may provide users with a more flexible viewing experience that utilizes the enhanced playback capabilities described above compared to other advertising-based systems. Further, this also may greatly simplify the technical aspects of enabling the media playback, as it avoids the challenge of enforcing mandatory advertisement content playback while permitting more flexible entertainment content playback.

Method 100 may offer various other advantages to users. For example, providing advertising content separately from entertainment content may assist users in time management. For example, multiple advertisements may be viewed in bursts as time permits, thereby accumulating a greater amount of advertising viewing credit. Further, because advertising content may be viewed separately from entertainment content, the amount of time used to view entertainment content may be reduced.

Method 100 also may offer benefits to advertisers. For example, where user profiles are implemented, advertisers may have a greater ability to target specific users, as users have an incentive to be logged in, thereby potentially providing more information to advertisers. Likewise, user accounts may include user profiles that allow advertising content to be targeted to specific users, thereby providing potentially more relevant and interesting advertising content to users. Further, the value of watching advertisements is imparted to the user directly by correlating advertising viewing credit value to a specific purchase price (in advertising viewing credit and/or in cash, as described in more detail below). This linking of advertising viewing to value may make viewers more willing to watch advertising content rather than to ignore the advertising content during playback of the advertising content. Additionally, method 100 offers a potentially flexible pricing model for ads. For example, advertising viewing credit values may be assigned based upon the price of an advertising content item. Further, viewers may be permitted to select between advertisements based upon the content and value of an advertising content item. Also, the online environment of method 100 opens the opportunity for accepting and/or soliciting user feedback on advertising content items, which may provide information regarding advertising effectiveness.

Method 100 also may provide various advantages for entertainment content providers. For example, method 100 allows advertising to be decoupled from specific entertainment content. Therefore, entertainment content programming choices may be handled specifically based upon user preference rather than advertiser preferences. Also, improving the user viewing experience by providing less restricted entertainment content may help to increase sales of content and also increase market share over competitors, and therefore may help to increase revenue. Furthermore, demographic information about users who are watching content may allow for informed programming decisions. Additionally, the above-described advantages for advertisers may help advertisers to choose a user of method 100 over users of other methods of providing entertainment content.

It will be appreciated that method 100, as well as other embodiments described herein, may be implemented via computer-executable instructions or code, such as programs, stored on a computer-readable storage device and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, clients, laptop computers, hand-held devices, cellular phones, media players, digital cameras, microprocessor-based programmable consumer electronics and/or appliances, routers, gateways, hubs and other computer networking devices.

Various more detailed aspects of method 100 may be implemented in any suitable manners. Such details may include, but are not limited to, the price in advertising viewing credit of an entertainment content item, how much credit a user earns by viewing an advertising content item, how much advertisers are charged for each view of an advertising content item, whether an amount of advertising viewing credit that can be accumulated is limited, whether advertising credits expire if not used within a selected time frame, and whether/what type of information about users is tracked for the purpose of targeted advertising. It will be understood that any suitable variations of these factors and/or any other suitable factors may be used in more specific embodiments of method 100 without departing from the scope of the present disclosure.

Figure 2:
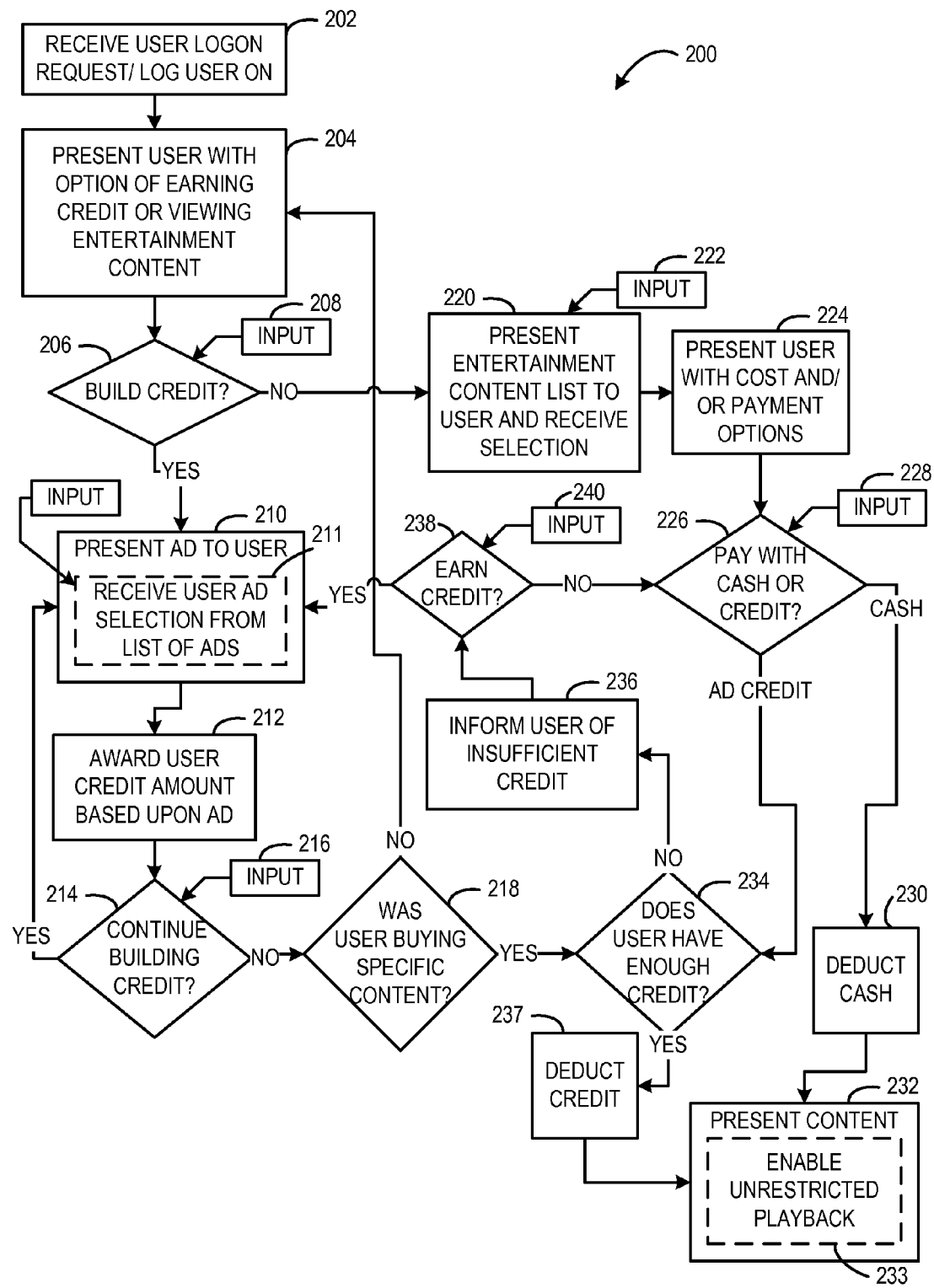
FIG. 2 shows a process flow depicting another embodiment of a method for providing entertainment content in exchange for advertising viewing credit.

FIG. 2 shows an embodiment of a method 200 for providing entertainment content that illustrates one example of a more detailed implementation of method 100. It will be understood that method 200 may be implemented by an entertainment content provider, an advertising content provider, an intermediary between the entertainment content provider and the advertising content provider, or by any other suitable person or entity.

Method 200 first comprises, at 202, receiving a user logon request, and then logging the user on. Next, the user is presented, at 204, with a choice of whether to earn advertising viewing credit or to view entertainment content. If, at 206, an input 208 is received from the user to build advertising viewing credit, then method 200 comprises, at 210, presenting an advertising content item to the user. It will be understood that the input may be received, for example, over a network from a client computing device operated by the user.

In some embodiments, the advertising content item presented to the viewer is chosen by the entity providing the entertainment content and/or the advertising content. In these embodiments, the advertising content item may be selected randomly, may be provided based upon a pre-selected order of a plurality of advertising content items, may be targeted based upon one or more known user profile characteristics (e.g. age, sex, hobbies, interests, etc.), and/or upon one or more viewing behavior characteristics (e.g. show being viewed, time that show is being viewed, etc.). In other embodiments, as indicated at 211, the user may be able to select a desired advertising content item for viewing, for example, from a list of all available items, from a list of a subgroup of available items selected based upon one or more profile and/or viewing behavior characteristics, etc.

Furthermore, in yet other embodiments, an amount of advertising credit awarded for viewing an ad may be variable depending upon user demographics. For example, an advertiser may pay more to show an advertisement to a likely purchaser than to an unlikely purchaser. In this case, the likely purchaser may be awarded more advertising viewing credit than the unlikely purchaser. As a more specific example, a manufacturer of high-cost automobiles may wish to pay less to have 12-18 year olds view advertisements than 45-50 year olds, as the latter is more likely to purchase the manufacturer's goods. Therefore, in this case, the latter user may be rewarded more advertising credit for viewing the ad. It will be understood that these are merely examples of ways in which advertising content items may be selected, and that advertising content items may be selected for provision to a user in any suitable manner. It will further be understood that the term "advertising content item" as used herein may represent a single advertisement or a plurality of advertisements provided as a group.

After the user has viewed (or listened to, etc.) the advertising content item, method 200 next comprises awarding the user an amount of advertising viewing credit based upon the advertising content item viewed. In some embodiments, equal amounts of advertising viewing credit are awarded for each advertising content item viewed, while in other embodiments, the amount of advertising viewing credit awarded to the user may vary depending upon the advertising content item viewed.

After viewing an advertising content item, the user is presented at 214 with the choice of continuing to build advertising viewing credit or completing the credit building session. If the user inputs at 216 the choice of continuing to build advertising viewing credit, then method 200 loops back to 210, where an additional advertising content item is presented to the user, and where additional advertising viewing credit is awarded to the user upon viewing the additional advertising content item. On the other hand, if the user inputs at 216 the choice of completing the current credit building session, them then method 200 proceeds to 218, where it is determined if the credit building session was conducted in response to a user's desire to buy specific content. In the present example, the user did not enter the advertising viewing credit building session in response to an attempt to buy specific content, so method 200 loops back to 204, where the user is again presented with the option of building advertising viewing credit or viewing entertainment content. The case in which the advertising viewing credit building session was entered to buy specific content is described in more detail below.

Continuing, once the user has accumulated advertising viewing credit, the user may make an input 208 requesting not to build credit, but instead to view entertainment content. In this instance, method 200 proceeds to 220, where the user is presented with a list of available entertainment content items. The user then may select, via input 222, a desired entertainment content item for transmission and viewing. Upon receiving this selection, method 200 next comprises, at 224, displaying the cost of the purchase (which also or alternatively may be displayed on the list presented at 220), and presenting the user with one or more payment options. Any suitable set of payment options may be presented to the user. For example, in some embodiments, the only payment option may be previously-earned advertising viewing credit. In this case, the presentation of payment options 224 may be a confirmation of the price (in advertising viewing credit) of the purchase.

In other embodiments, multiple payment options may be supported. For example, as indicated at 226, a user may be able to pay via cash (e.g. previously deposited cash, gift card, credit card, debit card, etc.) or via advertising viewing credit. In this embodiment, a user may choose to pay with cash if the user has insufficient advertising viewing credit, if the user does not wish to spend advertising viewing credit, etc. Continuing with FIG. 2, if the user elects via input 228 to pay with cash, then cash is deducted at 230, and the entertainment content is presented to the user at 232. As described above, the entertainment content may be presented in its entirety, without any advertisements interspersed within the content. This may enable unrestricted playback, as indicated at 233, in which the user can skip freely throughout the content selection.

On the other hand, if the user elects via input 228 to pay with advertising viewing credit, then method 200 next comprises determining at 234 whether the user has sufficient advertising viewing credit to purchase the selected entertainment content item. If so, then method 200 comprises deducting the cost of the entertainment content item from the user's previously-earned advertising viewing credit at 237, and then presenting the content to the user at 232. On the other hand, if the user does not have sufficient advertising viewing credit to purchase the entertainment content item, then method 200 comprises, at 236, informing the user of the insufficient credit, and then, at 238, giving the user the option to earn advertising viewing credit.

If the user elects via input 240 not to earn advertising viewing credit, then method 200 returns to 226, where the user is presented with the option of paying with cash or advertising viewing credit. On the other hand, if the user elects via input 240 to earn advertising viewing credit, then method 200 proceeds to 210 where the user enters an advertising viewing credit building session, as described above. The user may continue earning advertising viewing credit as desired. Once the user elects to finish the current advertising viewing credit building session (via input 216), it is determined at 218 whether the user was buying a specific entertainment content item. In this example, the user was building credit to buy a specific entertainment content item. Therefore, method 200 next proceeds to 234, where it is determined if the user accumulated sufficient credit to purchase the entertainment content item. If so, then the amount of credit corresponding to the cost of the selected entertainment content item is deducted at 237, and the selected entertainment content item is presented at 232. On the other hand, if the user still does not have sufficient credit to purchase the selected entertainment content item, then the user is again informed of lack of sufficient credit at 236, and is again given the option to earn more credit at 238. It will be understood that the embodiment of FIG. 2 is shown for the purpose of example, and that the concepts disclosed herein may be implemented in any other suitable manner.

Figure 3:
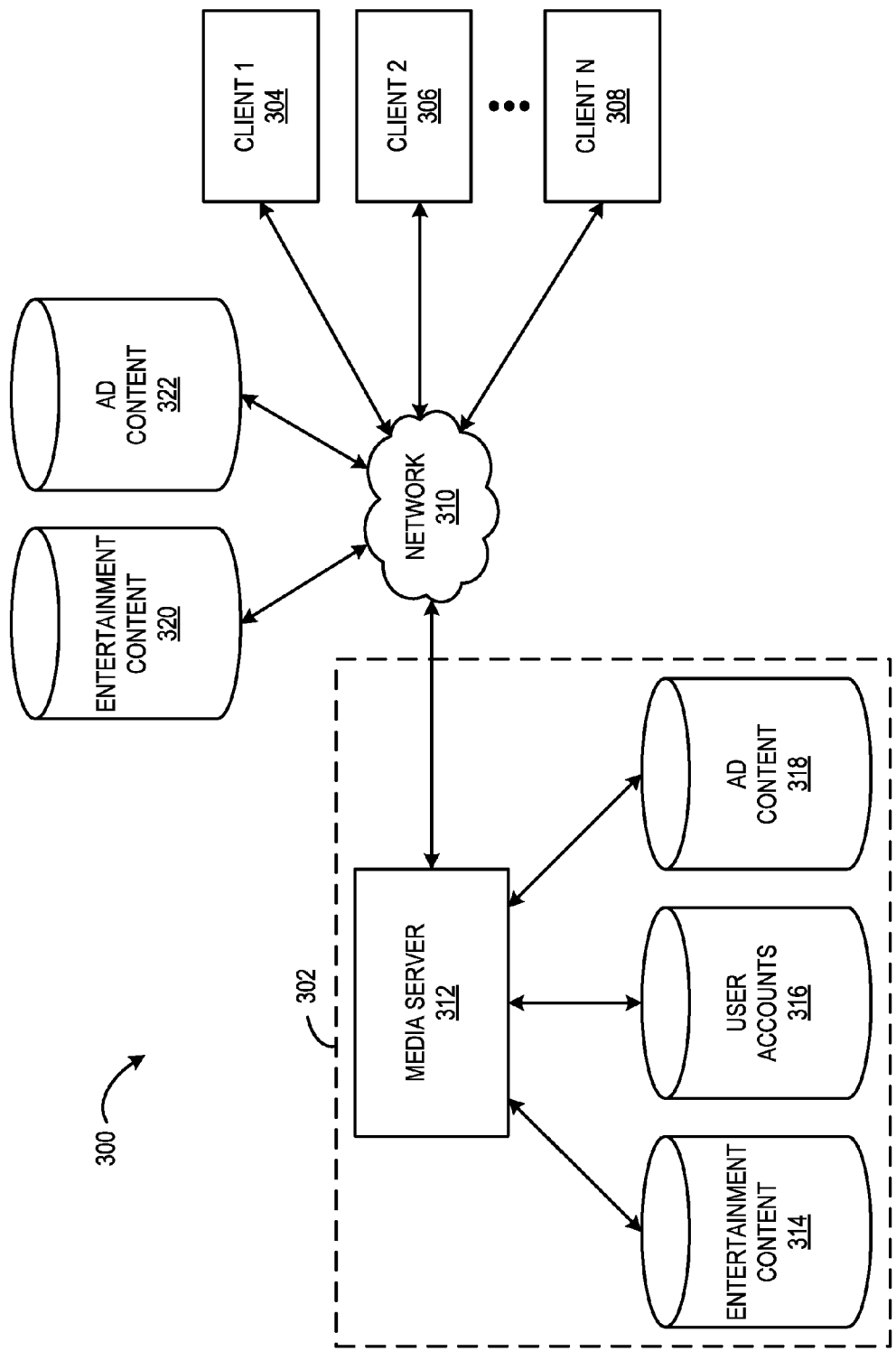
FIG. 3 shows an embodiment of a networked media environment.

FIG. 3 shows an example of an embodiment of a use environment for methods 100 and 200, in the form of a network media environment 300. Network media environment 300 comprises a media server system 302 and a plurality of clients (shown as client 1 304, client 2 306, and client N 308) all connected to a network 310. The media server system 302 comprises a media server 312 connected to the network and to a plurality of databases that includes an entertainment content database 314, a user accounts database 316, and an ad content database 318. It will be understood that the plurality of databases 314, 316, 318 may be part of the same computing device as the media server 312, or may be on separate computing devices, and may be located within a single facility or remotely from one another.

The entertainment server 312 also may be configured to control access to third-party content databases connected to the network 310. Such third-party databases may comprise, for example, an entertainment content database 320 maintained by a media company such as a television or movie producer. Such third-party databases also may comprise, for example, an advertising content database 322 maintained by an entertainment media company or advertising media company. It will be appreciated that these are merely examples of entities that may maintain entertainment and advertising content databases, and are not intended to be limiting in any manner. It also will be understood that some embodiments may comprise only third-party databases, other embodiments may comprise only local databases, and yet other embodiments may comprise both local and third-party databases in any suitable combination.

The media server 312 may be configured to control access to the entertainment content databases 314, 320 by allowing access to the content stored in these databases in exchange for payment via advertising viewing credit or other accepted forms of payment, such as cash. To access entertainment content stored in the entertainment content databases 314, 320, a user of client 1 (for example) may first request to log onto the media server 312.

Upon receiving a logon request, the media server 312 may access the user accounts database 316 to ensure the user has an account and to access information about the user. If no user account exists, the user may be prompted through an account set-up process. On the other hand, if the user already has an account, the then information in the user account may be accessed at this time.

Figure 4:
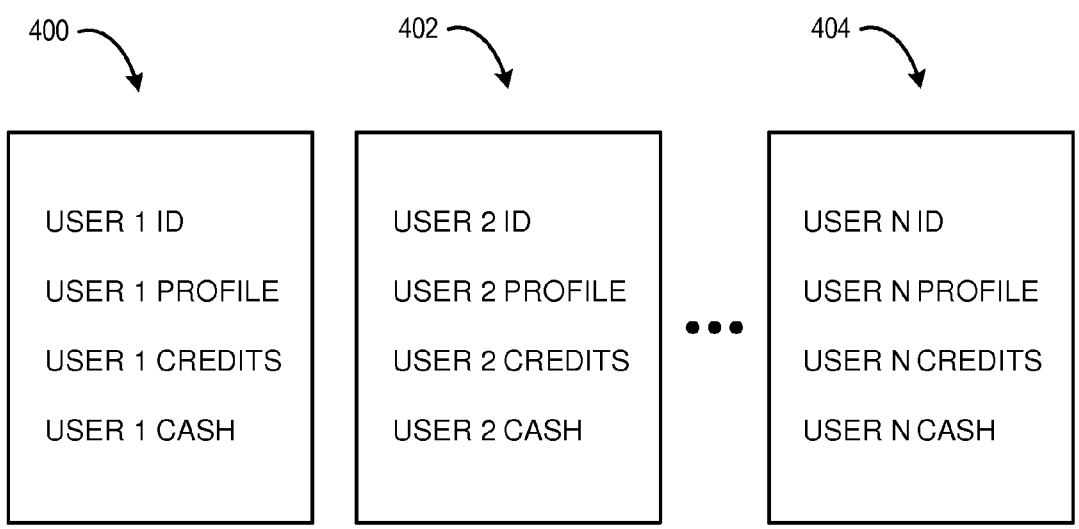
FIG. 4 shows an embodiment of a user account record suitable for use with the account database of the embodiment of FIG. 3.

Any suitable information may be stored in a user account. For example, in embodiments where user advertising viewing credit may be saved between viewing sessions, information regarding the number of advertising viewing credit may be stored in a user record in the user accounts database 316. A schematic example of a set 400 of user account records that may be stored in the user accounts database 316 is shown in FIG. 4. In this example, each depicted user record 402, 404, 406 (corresponding to a user 1, a user 2, and a user N of a system that supports N users) comprises a user identification (for example, a user name, an account number, etc.), profile information regarding the user (for example, age, sex, residence, hobbies, interests, statistical information regarding viewing habits, etc.), and/or any other suitable information.

Further, each depicted user record 400, 402, 404 also comprises information regarding how many previously-earned advertising viewing credit each user has. In this manner, the advertising viewing credits of a plurality of users may be tracked. Further, each user record 400, 402, 404 also comprises information regarding cash payments. The cash payment information may include a cash balance previously transferred into the user's account, and/or information regarding credit cards, debit cards, checking/savings account numbers, etc. that the user uses to make cash payments. It will be understood that the information depicted in the user records 400, 402, 404 in FIG. 4 is shown for the purpose of example, and that a user record may contain any suitable information. Further, it will be understood that information about users may also be stored at other network locations other than in the user accounts database 316. For example, various types of user information may be stored locally on clients 304, 306, 308, by a third party operating the entertainment content database 320 or advertising content database 322, or at any other suitable network location.

Continuing with FIG. 3, once the user has logged onto the media server 312, the media server 312 may present the user (for example, via information transferred to client 1 304) with a choice of whether to build advertising viewing credit or to view entertainment content. If the user chooses to view entertainment content, then the media server 312 may present the user with a selection of media content available on entertainment content databases 314, 320. Upon receiving a selection by the user of an entertainment content item to view, the media server 312 may verify that the user has sufficient advertising viewing credit to purchase the entertainment content item. If so, the media server 312 may transfer the entertainment content item over the network 310 for viewing on client 1, and deduct the corresponding amount of advertising viewing credit from the user's account information stored in user accounts database 316. On the other hand, if the user lacks sufficient advertising viewing credit to view the entertainment content item, then access to the item is denied, and the user may be presented, for example, with the option of earning advertising viewing credits or paying with cash.

If a user chooses to earn advertising viewing credits, either upon initial logon or after attempting to purchase a selected entertainment content item, the media server 312 transfers advertising content from one or more of advertising content servers 318, 322 to client 1 304 for presentation to the viewer. Upon viewing the advertising content, a corresponding amount of advertising viewing credit is awarded to the user's account record in user accounts database 316. In this manner, a user can accumulate advertising viewing credit for entertainment content purchase later in the same logon session, or even in a different session.

In this manner, advertising-supported entertainment content may be provided to users in a manner that permits a potentially greater utilization of network playback capabilities than that offered by other advertising-supported systems. It will be understood that various embodiments related to the purchase of entertainment content with advertising viewing credits disclosed herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of providing audio and/or video entertainment content to a user over a network, comprising:
   providing an advertising content item to the user;
   awarding an amount of advertising viewing credit to the user based upon the advertising content item being viewed by the user;
   receiving a request from the user to view an entertainment content item;
   verifying that the user has sufficient previously-earned advertising viewing credit to pay for the entertainment content item before sending the entertainment content item to the user;
   if the user has sufficient previously-earned advertising viewing credit to pay for the entertainment content item, then sending the entertainment content item without interspersed advertising to the user, and deducting at least a portion of the previously-earned advertising viewing credit in exchange for the entertainment content item; and
   if the user does not have sufficient previously-earned advertising viewing credit to pay for the entertainment content item, then prior to sending the entertainment content item to the user, then
   providing an option of sending a first portion of the entertainment content item without interspersed advertising in exchange for the previously-earned advertising viewing credit and sending a second portion of the entertainment content item with interspersed advertising, and
   providing another option of presenting one or more additional advertising content items to the user and awarding additional advertising viewing credit to the user based on the additional advertising content items viewed by the user.

2. The method of claim 1, further comprising, before providing the advertising content item to the user, presenting to the user a choice of whether to earn advertising viewing credit or to view entertainment content.

3. The method of claim 1, further comprising accepting payment from the user in a form other than advertising viewing credit or providing only a fractional portion of the entertainment content item in exchange for a fractional payment of advertising credit.

4. The method of claim 1, further comprising providing a plurality of advertising content items to the user, and awarding advertising viewing credit for each advertising content item provided to the user.

5. The method of claim 1, wherein the entertainment content item provided to the user is configured to enable playback of the entertainment content item in a manner uninterrupted by advertising content.

6. The method of claim 1, further comprising tracking an amount of advertising viewing credit earned by each user of a plurality of users.

7. The method of claim 1, further comprising selecting the advertising content item provided to the user based upon a profile of the user.

8. The method of claim 1, wherein the advertising content item is selected by a viewer for viewing.

9. The method of claim 1, wherein the amount of advertising viewing credit awarded is greater if the demographics of the user correspond to demographics associated with the advertising content item than if the demographics of the user do not correspond to demographics associated with the advertising content.

10. The method of claim 9, wherein demographics of the user include an age of the user, and wherein selecting an amount of advertising viewing credit comprises increasing the amount if the age of the user corresponds to an age range of likely purchasers associated with the advertising content.

11. A computing device comprising instructions stored thereon that are executable by the computing device to present content by:
    receiving a request from a user for transmission of an entertainment content item;
    sending a request to the user regarding whether the user desires to pay for the entertainment content item via previously-earned advertising viewing credit or via another form of payment;
    receiving confirmation from the user to pay for the entertainment content item via the previously-earned advertising viewing credit;
    verifying that the user has sufficient previously-earned advertising viewing credit to pay for the entertainment content item before sending the entertainment content item to the user;
    if the user has sufficient previously-earned advertising viewing credit to pay for the entertainment content item, then sending the entertainment content item without interspersed advertising to the user, and deducting at least a portion of the previously-earned advertising viewing credit in exchange for the entertainment content item; and
    if the user does not have sufficient previously-earned advertising viewing credit to pay for the entertainment content item, then prior to sending the entertainment content item to the user, then
    providing an option of sending a first portion of the entertainment content item without interspersed advertising in exchange for the previously-earned advertising viewing credit and a second portion of the entertainment content item with interspersed advertising, and
    providing another option of presenting one or more additional advertising content items to the user and awarding additional advertising viewing credit to the user based on the additional advertising content items viewed by the user.

12. The computing device of claim 11, wherein the instructions are executable to track an amount of advertising viewing credit earned by each user of a plurality of users.

13. The computing device of claim 11, wherein the instructions are executable to allow the user to play the entertainment content item in a manner uninterrupted by advertising content.

14. The computing device of claim 11, wherein the instructions are executable to send a request to the user regarding whether the user desires to build advertising credit or view entertainment content when the user initially logs onto the computing device.

15. The computing device of claim 11, wherein the instructions are executable to send to the user a list of entertainment content items available for purchase before receiving the request from the user for transmission of the entertainment content item.

16. A computer-readable device comprising instructions stored thereon that are executable by a computing device obtain entertainment content from a server for playback, the instructions comprising:
    code executable to receive an advertising content item and to present the advertising content item;
    code executable to receive an input selecting an entertainment content item for playback and to send a request for the entertainment content item selected to an entertainment content server;
    code executable to receive an alert of insufficient advertising viewing credit to purchase the entertainment content item;
    code executable to receive an input to pay for the entertainment content item with a combination of payment options including partial payment with advertising viewing credit earned via presentation of the advertising content item and partial payment with a form of payment for the entertainment content item other than advertising viewing credit;
    code executable to receive the entertainment content item from the entertainment content server;
    code executable to play the entertainment content item without interspersed advertising if the combination of payment options is received and covers a total cost of the entertainment content item; and
    code executable to, prior to playing the entertainment content item, provide the user an option of playing a first portion of the entertainment content item without interspersed advertising in exchange for the previously-earned advertising viewing credit and playing a second portion of the entertainment content item with interspersed advertising, and provide another option of presenting one or more additional advertising content items to the user and awarding additional advertising viewing credit to the user based on the additional advertising content items viewed by the user.

17. The computer-readable device of claim 16, further comprising code executable to display an option of viewing entertainment content or advertising content, and to receive an input from the user selecting to view entertainment content or advertising content.

18. The computer-readable device of claim 16, further comprising code executable to receive an input selecting the advertising content item for viewing from a list of available advertising content items.

* * * * *